(No Model.)
R. ELLWOOD & H. H. STAUGAARD.
WHEEL.
No. 299,120. Patented May 27, 1884.
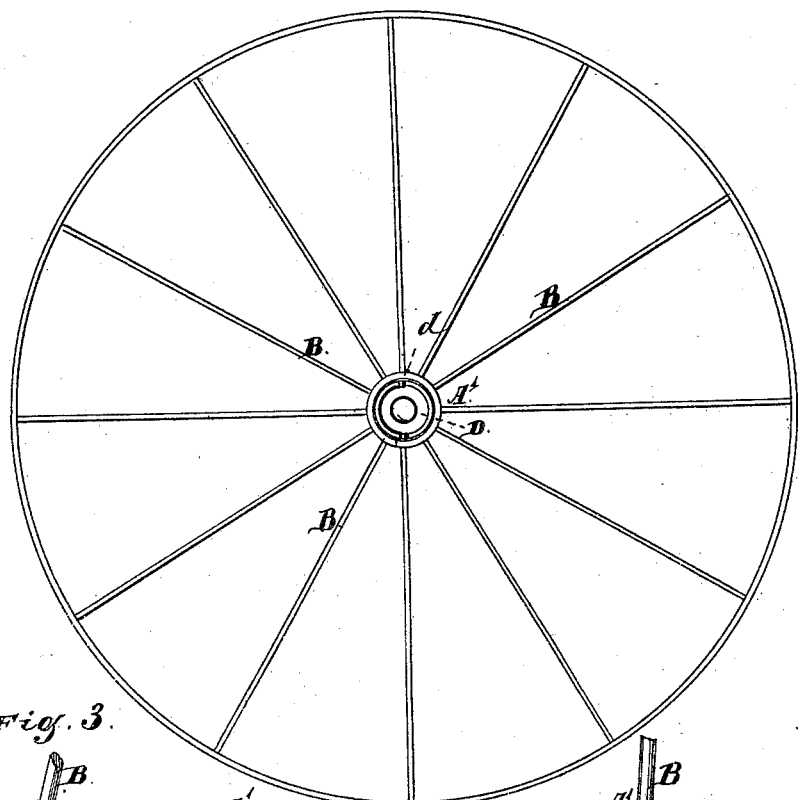
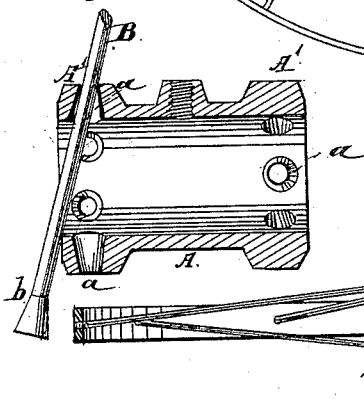
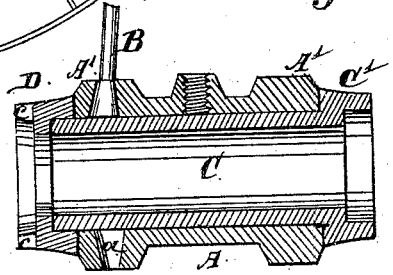
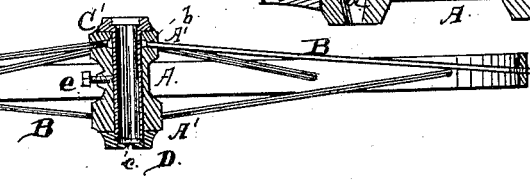
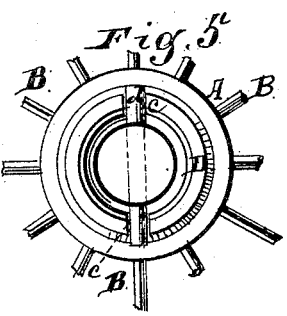

UNITED STATES PATENT OFFICE.

REUBEN ELLWOOD AND HANS HANSON STAUGAARD, OF SYCAMORE, ILLINOIS, ASSIGNORS TO THE R. ELLWOOD MANUFACTURING COMPANY, OF SAME PLACE.

WHEEL.

SPECIFICATION forming part of Letters Patent No. 299,120, dated May 27, 1884.

Application filed December 11, 1883. (No model.)

*To all whom it may concern:*

Be it known that we, REUBEN ELLWOOD and HANS HANSON STAUGAARD, residing at Sycamore, in the county of De Kalb and State of Illinois, and citizens of the United States, have invented a new and useful Improvement in Wheels, of which the following is a full description, reference being had to the accompanying drawings, in which—

Figure 1 is a side elevation; Fig. 2, a section; Fig. 3, a detail, being a longitudinal section of the hub, showing the manner of inserting the spokes; Fig. 4, a detail, being a longitudinal section of the hub and box, showing a spoke in place; Fig. 5, an end view of the hub and box.

This invention relates more particularly to the securing of spokes in metal wheels, and having the wheels strained from the hub outward, so as to be strong and firm in use, and has for its objects to enable the spokes to be slipped in from the interior of the hub and be drawn tight against the hub, so as to be rigid and taut, and in case of breakage to allow a spoke to be removed and readily replaced without removing the hub and tire; and its nature consists in the several devices and combinations of devices hereinafter described, and pointed out in the claims as new.

In the drawings, A represents the central portion of the hub, having at each end an enlarged portion, forming a flange, A', in which are openings $a$ for the ends of the spokes. This hub is made of malleable iron or other suitable material, cast or otherwise formed to have a central portion with enlarged ends, and the openings in the ends are of a tapering or countersunk shape on the interior, with sufficient inclination from the interior of the hub to the exterior to give the spokes the required inclination to center the tire, as shown in Fig. 2.

B represents the spokes, having at one end a head or upset portion, $b$, having a taper corresponding to that of the opening $a$, so that when the spokes are in place the head $b$ will fit snugly in the opening $a$. The other end of each spoke is screw-threaded to enter a screw-threaded opening in the tire, as shown in Fig. 2. The spokes are inserted by passing each spoke through its opening $a$ in the hub, as shown in Fig. 3, the opening $a$ being in such relation to the end face of the hub as to allow this passing of the spokes to be accomplished, and this end is further facilitated by the inclination given to the openings $a$ to center the spokes with the tire, and when the spokes have been passed through the openings the screw-threaded ends are turned into the holes therefor in the tire by means of pipe-tongs or other suitable device, drawing the spokes B snugly into the openings $a$, as shown in Fig. 4.

C represents the pipe-box, having an exterior diameter to fit the interior opening in the hub A, and having a longitudinal opening to receive the axle-spindle. This box is somewhat longer than the hub, and at one end is provided with a flanged or enlarged portion, C', which abuts against the axle, fitting around the spindle, and forms a sand-guard, as usual, and the other end of this pipe-box is of the same diameter as the body of the box, and projects beyond the end of the hub, as shown in Fig. 4.

D represents a cap having on one end a recess which fits over the projecting end of the pipe-box, as shown in Fig. 4, and having an interior flange with an opening corresponding in diameter to the opening for the axle-spindle in the pipe-box; and, as shown, the other end of this cap D is recessed out, and its edge is provided with two openings, $c$, for the passage of a linchpin or key, $d$, by which the wheel is retained on the spindle. This cover or cap D fits snugly around the projecting end of the pipe-box, and also fits snugly against the end of the hub, forming a sand-box against the entrance of sand, grit, and dirt, and forming also a retaining device, by which the lubricant is kept from passing out readily. The spokes screwed into the tire from the inside draw against the hub, thus having an outward draw instead of an inward, the result being that the tire will be held strained and the spokes firm and taut, and by making the hub as shown and described, and passing the spokes through from the interior, it will be seen that the spokes can be readily set, and also that in case a spoke breaks it can be readily withdrawn and replaced by another spoke without removing the hub and tire; and, if desired, the ends of the spokes can be left to rest on the periphery of the pipe-box, or they can be drawn up clear of the pipe-box in the openings $a$, and when left to rest on the pipe-box they can be made smooth and level with the opening in the hub by means of a suitable reamer or other tool.

As shown, the hub is locked to the pipe-box, so as to be firm therewith, by a set-screw, $e$, passing through the body of the hub, with its end engaging the periphery of the box; but the two devices could be locked together in some other manner and by some other means.

What we claim as new, and desire to secure by Letters Patent, is—

1. The hub A A′, having openings $a$, and spokes B, having heads $b$, in combination with a pipe-box, C, substantially as and for the purpose specified.

2. The hub A A′, having openings $a$, and spokes B, having heads $b$, in combination with the pipe-box C and cap or cover D, substantially as and for the purposes specified.

REUBEN ELLWOOD.
HANS HANSON STAUGAARD.

Witnesses:
JOHN LYME,
ISAAC KIRKPATRICK.